（12) United States Patent
Ferguson et al.

(10) Patent No.: US 9,879,633 B2
(45) Date of Patent: Jan. 30, 2018

(54) SYSTEM AND METHOD FOR IMPROVING VACUUM GENERATION

(71) Applicant: Ford Global Technologies, LLC, Dearborn, MI (US)

(72) Inventors: Russell William Ferguson, Ypsilanti, MI (US); Joel John Beltramo, West Bloomfield, MI (US); Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 682 days.

(21) Appl. No.: 14/559,076

(22) Filed: Dec. 3, 2014

(65) Prior Publication Data

US 2016/0160792 A1    Jun. 9, 2016

(51) Int. Cl.

| F02D 31/00 | (2006.01) |
|---|---|
| F02D 41/40 | (2006.01) |
| F02B 9/02 | (2006.01) |
| F02D 41/02 | (2006.01) |
| F02D 41/08 | (2006.01) |
| F02D 41/10 | (2006.01) |
| F02D 41/26 | (2006.01) |

(52) U.S. Cl.
CPC .............. *F02D 41/401* (2013.01); *F02B 9/02* (2013.01); *F02D 41/0215* (2013.01); *F02D 41/08* (2013.01); *F02D 41/107* (2013.01); *F02D 41/26* (2013.01); *F02D 2200/602* (2013.01); *F02D 2200/703* (2013.01); *F02D 2250/41* (2013.01); *F02D 2400/12* (2013.01); *Y02T 10/44* (2013.01)

(58) Field of Classification Search
CPC ...... F02D 41/401; F02D 41/107; F02D 41/26; F02D 41/0215; F02D 41/08; F02D 2400/12; F02D 2200/602; F02D 2200/703; F02D 2250/41; F02B 9/02; Y02T 10/44
See application file for complete search history.

(56) References Cited

U.S. PATENT DOCUMENTS

| 3,003,823 | A | * | 10/1961 | Williams | ............... | F01L 13/06 |
|---|---|---|---|---|---|---|
| | | | | | | 123/320 |
| 4,297,978 | A | * | 11/1981 | Matsui | .................... | F02D 35/00 |
| | | | | | | 123/339.22 |
| 4,719,751 | A | * | 1/1988 | Kume | ................... | F01N 3/0211 |
| | | | | | | 60/278 |
| 4,945,870 | A | * | 8/1990 | Richeson | ............... | F02B 69/06 |
| | | | | | | 123/179.21 |

(Continued)

FOREIGN PATENT DOCUMENTS

JP          2005330844 A     12/2005

OTHER PUBLICATIONS

Pursifull, Ross D. et al., "System and Method for Generating Vacuum via an Engine," U.S. Appl. No. 14/559,042, filed Dec. 3, 2014, 33 pages.

*Primary Examiner* — Hung Q Nguyen
(74) *Attorney, Agent, or Firm* — Julia Voutyras; McCoy Russell LLP

(57) ABSTRACT

Methods and systems for improving vacuum generation for a diesel powered vehicle that includes a mechanically engine driven vacuum pump are presented. In one non-limiting example, engine idle speed may be increased in response to a number of braking events and/or a request for vacuum based on an amount of stored vacuum.

20 Claims, 4 Drawing Sheets

(56) References Cited

U.S. PATENT DOCUMENTS

| | | | | |
|---|---|---|---|---|
| 5,332,056 A | * | 7/1994 | Niibe | B60K 31/0008 |
| | | | | 180/169 |
| 5,960,777 A | * | 10/1999 | Nemser | B01D 53/228 |
| | | | | 123/26 |
| 2003/0104904 A1 | * | 6/2003 | Ogawa | B60T 13/52 |
| | | | | 477/183 |
| 2009/0044785 A1 | * | 2/2009 | Maly | F02M 25/0818 |
| | | | | 123/519 |
| 2013/0057055 A1 | * | 3/2013 | Miyashita | B60T 13/52 |
| | | | | 303/12 |

* cited by examiner

SYSTEM AND METHOD FOR IMPROVING VACUUM GENERATION

BACKGROUND/SUMMARY

Diesel powered vehicles may have advantages over spark ignited engines. For example, diesel engines may have reduced pumping losses and higher efficiency as compared to spark ignition engines. However, diesel engines are often operated with high intake manifold pressures to improve engine efficiency. Consequently, there may be fewer opportunities for a diesel engine to provide vacuum to operate vehicle systems that are assisted or powered via vacuum. One way for a diesel engine to provide vacuum to vehicle systems is to mechanically couple a vacuum pump to the diesel engine. As the engine rotates, the vacuum pump generates vacuum and evacuates a vacuum reservoir. Nevertheless, at lower engine speeds, such as idle speeds, the vacuum pump may not generate sufficient vacuum to operate some vacuum operated systems. Therefore, the vacuum operated systems may not perform as is desired. For example, if a diesel engine is idling and a driver repeatedly applies and releases vehicle brakes, the driver may notice undesirable hard brake pedal feel (e.g., increased resistance to brake application by the driver). The hard brake pedal feel may be a result of less than a desired amount of vacuum being available to operate the vehicle brakes.

The inventor herein has recognized the above-mentioned issue and has developed an engine method, comprising: increasing a speed of a vacuum pump via increasing engine idle speed when an engine is idling in response to a request to increase an amount of stored vacuum.

By increasing an engine idle speed in response to a request to increase an amount of stored vacuum, it may be possible to provide the technical result of increasing an amount of vacuum produced via a mechanical vacuum pump coupled to a diesel engine during engine idle conditions. For example, an engine may be controlled to a base engine idle speed when a driver has not applied an accelerator pedal. The base engine idle speed may be a speed that conserves fuel and is a speed less than a speed where a torque converter transfers more than a threshold amount of torque. However, a vacuum pump coupled to the engine may make less vacuum than is desired at the base engine idle speed. By increasing engine idle speed to a speed greater than base idle speed, the vacuum pump may increase its vacuum output, thereby improving operation of the vehicle's vacuum operated systems.

The present description may provide several advantages. Specifically, the approach may improve operation of a vehicle's vacuum operated systems. Additionally, the approach may not increase engine fuel consumption much of the time since the approach may only be applied during selected engine operating conditions that may not be frequently encountered. Further, the approach may compensate for vacuum generation at ambient conditions that may reduce or increase the rate of vacuum generation.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
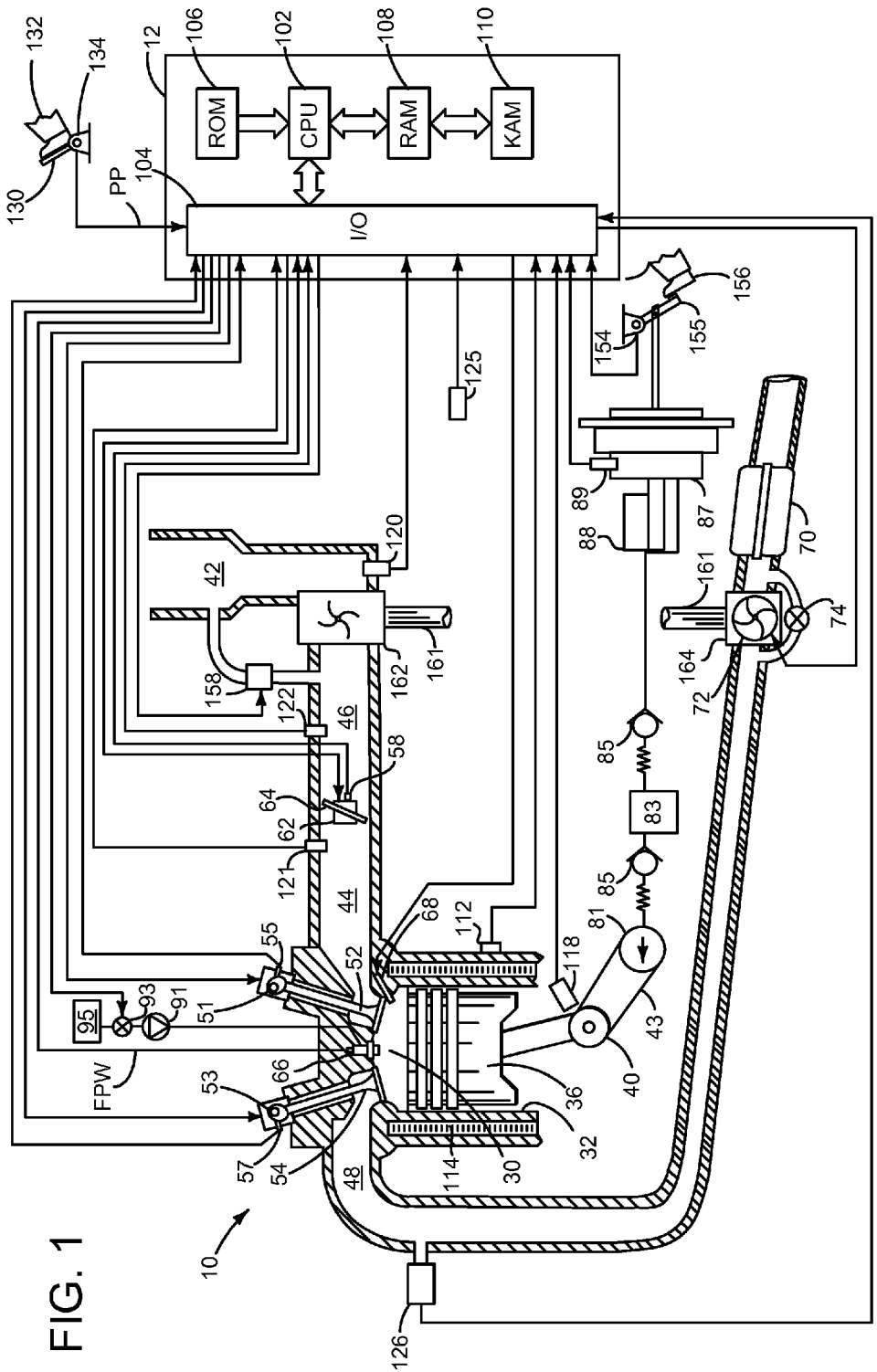
FIG. 1 shows a schematic depiction of an engine and vacuum system.
Figure 2:
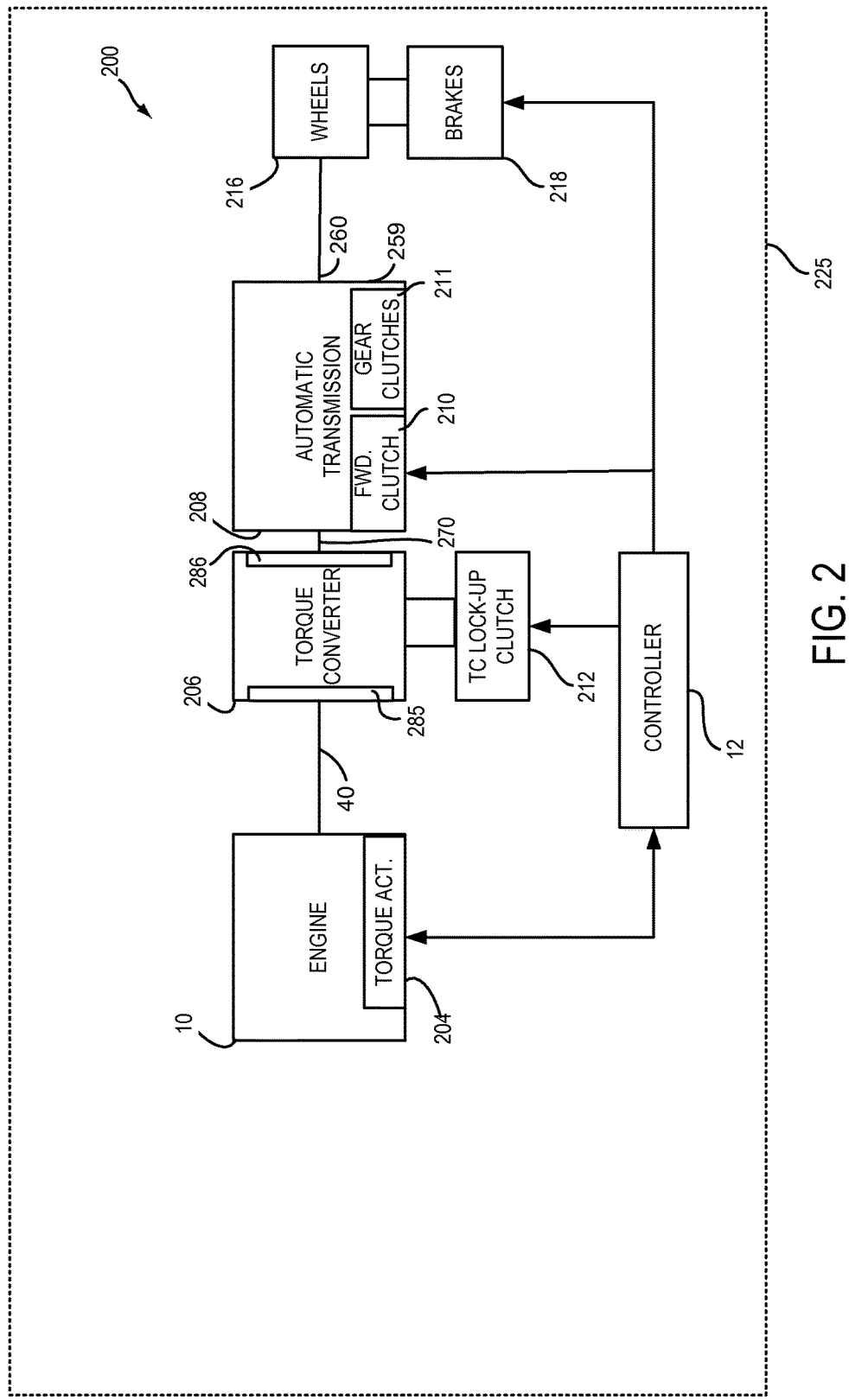
FIG. 2 shows a schematic depiction of an example vehicle driveline.

The present description is related to proving vacuum to a vehicle that includes a diesel engine. The diesel engine may be configured as is shown in FIG. 1. The engine of FIG. 1 may be incorporated into a vehicle driveline as shown in FIG. 2. The system of FIGS. 1 and 2 may include executable instructions to provide the method of FIG. 3. A diesel engine may produce additional vacuum via increasing engine speed as is shown in the sequence of FIG. 4.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into combustion chamber 30, which is known to those skilled in the art as direct injection. Fuel injector 66 delivers fuel in proportion to the pulse width of signal FPW from controller 12. Fuel is delivered to fuel injector 66 by a fuel system including a fuel tank 95, fuel pump 91, fuel pump control valve 93, and fuel rail (not shown). Fuel pressure delivered by the fuel system may be adjusted by varying a position valve regulating flow to a fuel pump (not shown). In addition, a metering valve may be located in or near the fuel rail for closed loop fuel control. A pump metering valve may also regulate fuel flow to the fuel pump, thereby reducing fuel pumped to a high pressure fuel pump.

Intake manifold 44 is shown communicating with optional electronic throttle 62 which adjusts a position of throttle plate 64 to control air flow from intake boost chamber 46. Compressor 162 draws air from air intake 42 to supply boost chamber 46. Exhaust gases spin turbine 164 which is coupled to compressor 162 via shaft 161. In some examples, a charge air cooler may be provided. Compressor speed may be adjusted via adjusting a position of variable vane control 72 or compressor bypass valve 158. In alternative examples, a waste gate 74 may replace or be used in addition to variable vane control 72. Variable vane control 72 adjusts a position of variable geometry turbine vanes. Exhaust gases can pass through turbine 164 supplying little energy to rotate turbine 164 when vanes are in an open position. Exhaust gases can pass through turbine 164 and impart increased force on turbine 164 when vanes are in a closed position. Alternatively, wastegate 74 allows exhaust gases to flow around turbine 164 so as to reduce the amount of energy supplied to the turbine. Compressor bypass valve 158 allows compressed air at the outlet of compressor 162 to be returned to the input of compressor 162. In this way, the efficiency of compressor 162 may be reduced so as to affect the flow of compressor 162 and reduce the possibility of compressor surge.

Combustion is initiated in combustion chamber 30 when fuel ignites due to compression when piston 36 is near top-dead-center compression stroke. In some examples, a universal Exhaust Gas Oxygen (UEGO) sensor 126 may be coupled to exhaust manifold 48 upstream of emissions device 70. In other examples, the UEGO sensor may be located downstream of one or more exhaust after treatment devices. Further, in some examples, the UEGO sensor may be replaced by a NOx sensor that has both NOx and oxygen sensing elements.

At lower engine temperatures glow plug 68 may convert electrical energy into thermal energy so as to raise a temperature in combustion chamber 30. By raising temperature of combustion chamber 30, it may be easier to ignite a cylinder air-fuel mixture via compression.

Engine 10 may include a mechanical vacuum pump 81 to generate vacuum. Mechanical vacuum pump 81 generates vacuum in vacuum reservoir 83 when mechanical vacuum pump 81 is rotated via engine 10. Mechanical vacuum pump 81 may be mechanically coupled to engine 10 via a belt or gear 43. Check valves 85 allow air to flow from reservoir 83 to mechanical vacuum pump 81. Vacuum reservoir 83 supplies vacuum to vacuum operated brake booster 87. Brake booster 87 assists operator foot 156 to apply brake pedal 155, which increases oil pressure in vehicle brakes (not shown) that are hydraulically coupled to master cylinder 88.

Emissions device 70 can include an oxidation catalyst and particulate filter, in one example. In another example, multiple emission control devices, each with multiple bricks, can be used. In other examples, the emissions device may include a lean NOx trap or a selective catalyst reduction (SCR), and/or a diesel particulate filter (DPF).

Controller 12 is shown in FIG. 1 as a conventional microcomputer including: microprocessor unit 102, input/output ports 104, read-only memory (e.g., non-transitory memory) 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a position sensor 154 coupled to brake pedal 155; a measurement of brake booster vacuum from sensor 89; a measurement of engine manifold pressure (MAP) from pressure sensor 121 coupled to intake manifold 44; boost pressure from pressure sensor 122 exhaust gas oxygen concentration from oxygen sensor 126; an engine position sensor from a Hall effect sensor 118 sensing crankshaft 40 position; a measurement of air mass entering the engine from sensor 120 (e.g., a hot wire air flow meter); a measurement of throttle position from sensor 58; and a measure of barometric pressure from sensor 125. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In some examples, fuel may be injected to a cylinder a plurality of times during a single cylinder cycle.

In a process hereinafter referred to as ignition, the injected fuel is ignited by compression ignition resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples. Further, in some examples a two-stroke cycle may be used rather than a four-stroke cycle and the engine may be a spark ignited engine rather than a compression ignition engine.

Referring now to FIG. 2, FIG. 2 is a block diagram of a vehicle 225 including a driveline 200. The driveline of FIG. 2 includes engine 10 shown in FIG. 1. Driveline 200 may be powered by engine 10. Engine crankshaft 40 is shown coupled to torque converter 206. In particular, engine crankshaft 40 is mechanically coupled to torque converter impeller 285. Torque converter 206 also includes a turbine 286 to output torque to transmission input shaft 270. Transmission input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft 270 of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-6) 211 and forward clutch 210. The gear clutches 211 (e.g., 1-10) and the forward clutch 210 may be selectively engaged to propel a vehicle. Torque output from the automatic transmission 208 may in turn be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216.

Further, a frictional force may be applied to wheels 216 by engaging wheel brakes 218. In one example, wheel brakes 218 may be engaged in response to the driver pressing his foot on a brake pedal as shown in FIG. 1. In other examples, controller 12 or a controller linked to controller 12 may apply engage wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

Controller 12 may be configured to receive inputs from engine 10, as shown in more detail in FIG. 1, and accordingly control a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from DISG by adjusting current flowing to and from field and/or armature windings of DISG as is known in the art.

When idle-stop conditions are satisfied, controller 12 may initiate engine shutdown by shutting off fuel and/or spark to the engine. However, the engine may continue to rotate in some examples. Further, to maintain an amount of torsion in the transmission, the controller 12 may ground rotating elements of transmission 208 to a case 259 of the transmission and thereby to the frame of the vehicle. When engine restart conditions are satisfied, and/or a vehicle operator wants to launch the vehicle, controller 12 may reactivate engine 10 by craning engine 10 and resuming cylinder combustion.

Thus, the method of FIGS. 1 and 2 provides for an engine system, comprising: a compression ignition engine including a combustion chamber; a vacuum pump mechanically coupled to the compression ignition engine; and a controller including instructions stored in a non-transitory for increasing output of the vacuum pump via increasing engine idle speed, the engine idle speed increased based on barometric pressure and an actual total number of braking events. The engine system includes where the number of braking events is based on an actual total number of times a brake pedal is applied and released. The engine system further comprises additional instructions to increase the engine idle speed in response to an amount of stored vacuum. The engine system includes where the engine idle speed is increased in increments based on the actual total number of braking events.

In some examples, the engine system includes where engine idle speed is limited to less than a threshold speed where greater than a threshold percent of engine torque is transferred to a torque converter turbine. The engine system includes where the engine idle speed is increased every other change in brake pedal direction. The engine system includes where the engine idle speed is increased for every change in brake pedal direction.

Figure 3:
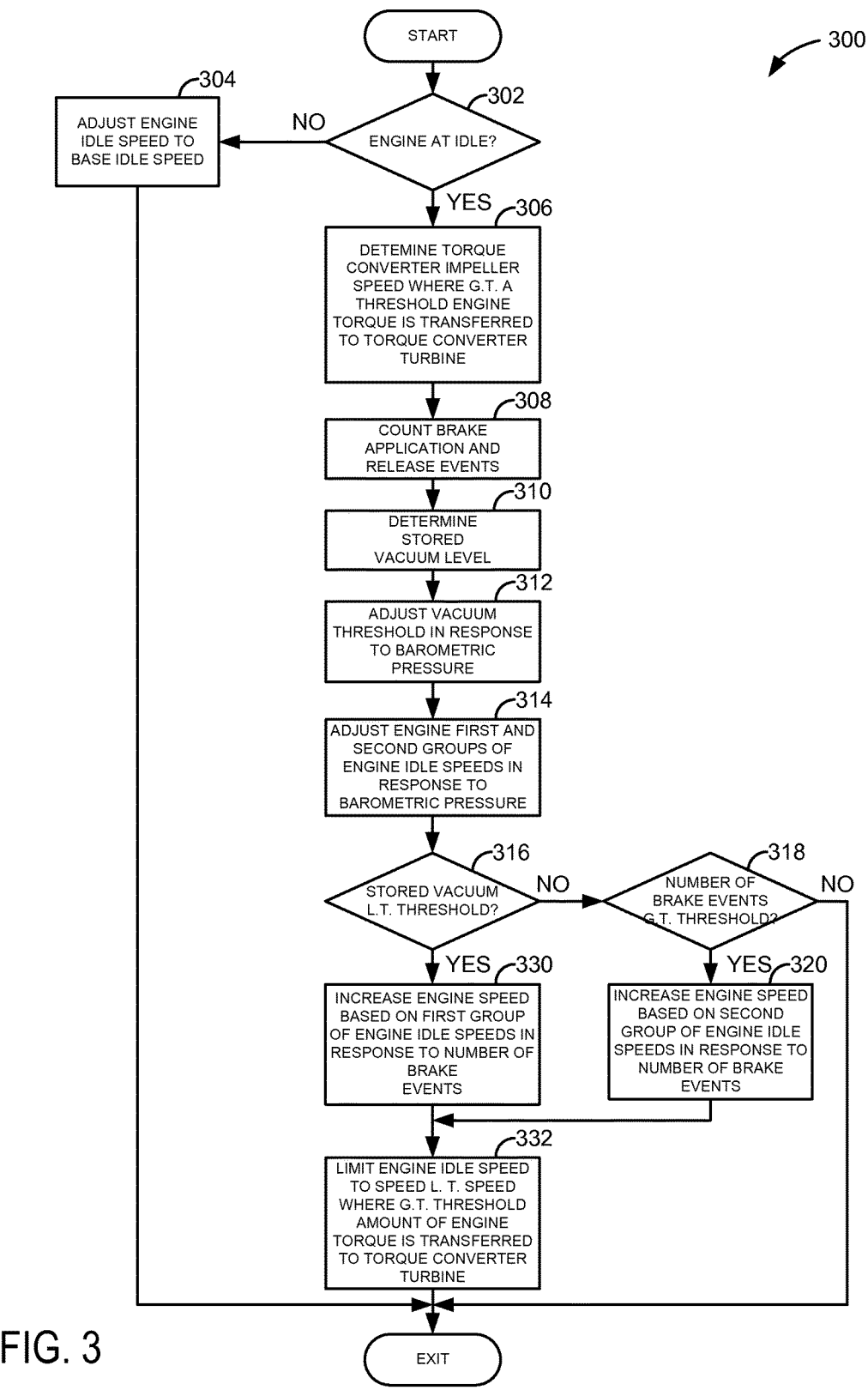
FIG. 3 shows a flowchart of an example method for improving vacuum generation for a vehicle having a diesel engine.
Figure 4:
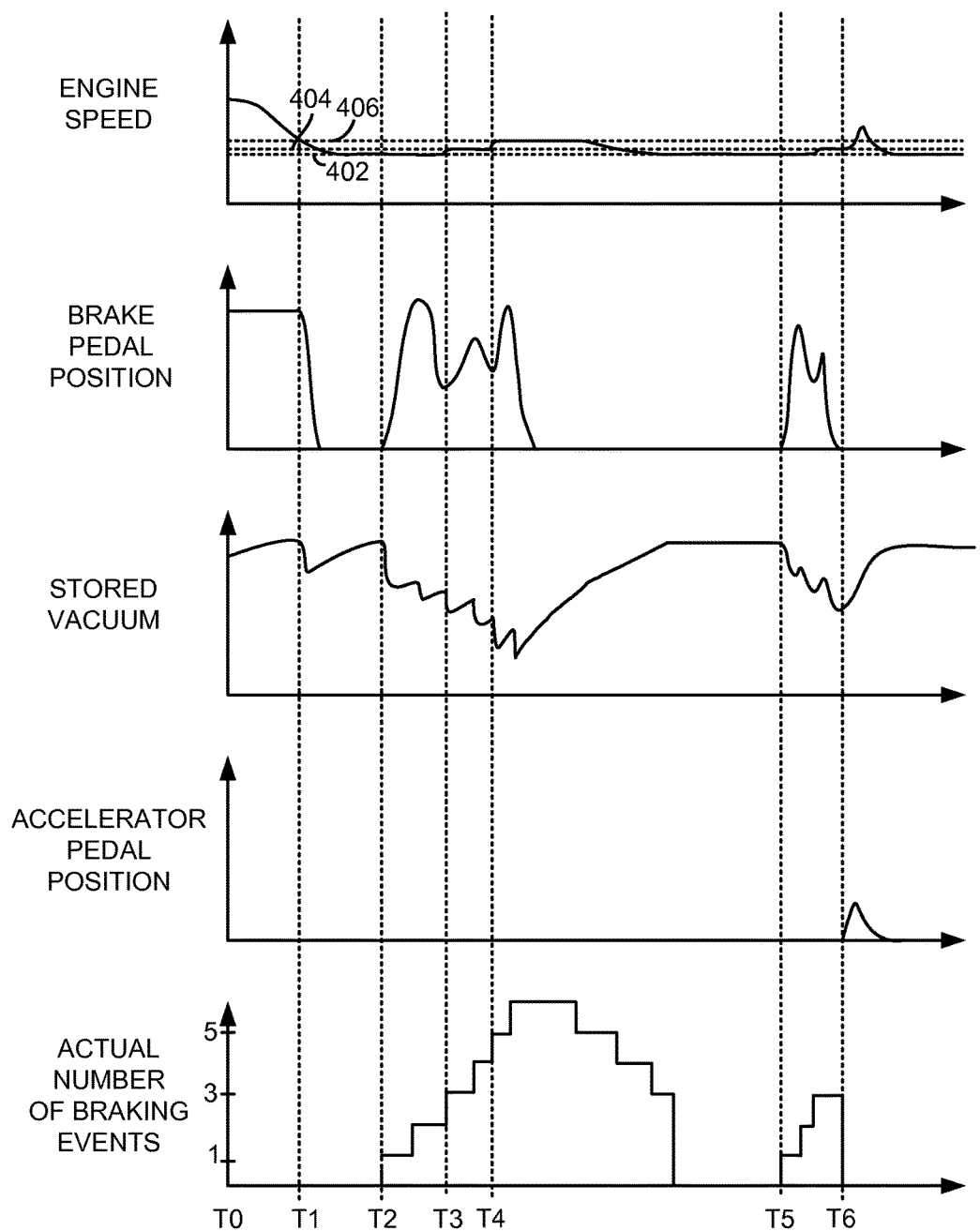
FIG. 4 shows an example vacuum generating sequence according to the method of FIG. 3.

Referring now to FIG. 3, a method for operating an engine is shown. The method of FIG. 3 may be incorporated into the system of FIGS. 1 and 2 as executable instructions stored in non-transitory memory. Further, the method of FIG. 3 may provide the operating sequence as is shown in FIG. 4.

At 302, method 300 judges whether or not the engine is at idle conditions. The engine may be at idle conditions when driver demand torque is substantially zero (e.g., less than three percent of full engine torque) and when the vehicle's speed is a creep speed or less. Creep speed may be defined as a speed a vehicle travels at when driver demand torque is zero after the vehicle moves after releasing vehicle brakes while vehicle speed is zero. The engine is not at idle conditions when the accelerator pedal is applied by a driver. If method 300 judges that the engine is not at idle, the answer is no and method 300 proceeds to 304. Otherwise, the answer is yes and method 300 proceeds to 306.

At 304, method 300 adjusts desired engine idle speed to a base idle speed. A base idle speed may be a speed the engine rotates at when the engine is warm and when driver demand is zero for a period of time. For example, a base idle speed for an eight cylinder engine may be 600 RPM. Additionally, an offset speed may be added to the base idle speed for cold ambient temperatures and cold engine temperatures. The engine speed may be adjusted to a base idle speed via reducing an amount of fuel injected to the engine and retarding fuel injection timing. By retarding fuel injection, peak cylinder pressure may be delayed during a cylinder cycle so that the engine produces less torque. Reducing the amount of injected fuel may reduce engine torque production since less chemical energy is available to the engine. Thus, the desired engine idle speed may be adjusted to the base engine idle speed when the engine is not at idle. Consequently, if the engine returns to idle conditions, the engine may idle at the desired base engine idle speed. Additionally, any braking events counted when the engine is at idle are cleared when the engine is not at idle conditions. Method 300 proceeds to exit after desired engine idle speed is adjusted to base engine idle speed.

At 306, method 300 determines a torque converter impeller speed where greater than (G.T.) a threshold percentage of engine torque is transferred to the torque converter turbine. Alternatively, method 300 may determine a threshold torque converter impeller speed where greater than a threshold amount of engine torque is transferred to the torque converter turbine or the transmission input shaft. In one example, a torque converter transfer function outputs a torque converter torque multiplier that is based on a difference in torque converter impeller speed and torque converter turbine speed. Thus, the torque converter impeller speed where greater than a threshold percentage of engine torque is transferred to the transmission may be determined by indexing the torque converter transfer function with the threshold percentage of torque transferred expressed as a torque converter torque multiplier and torque converter turbine speed. On the other hand, the torque converter impeller speed where greater than a threshold amount of engine torque may be transferred to the torque converter turbine may be determined via multiplying present engine torque (e.g., based on engine speed and load) by torque converter torque multipliers in the transfer function that are available at the present torque converter turbine speed and a range of torque converter impeller speeds. Method 300 proceeds to 308 after the torque converter impeller speed where more than a threshold amount of torque is transferred by the torque converter.

At 308, method 300 counts an actual total number of vehicle brake application and release events. A brake application event may be defined as an increase in brake pedal application distance (e.g., increasing an amount of braking requested) from conditions when the brake pedal was stopped at a position for more than a threshold amount of time or an increase in brake pedal application distance from a condition when the brake pedal was being released. A brake release event may be defined as a decrease in brake pedal application distance (e.g., decreasing an amount of braking requested) from conditions when the brake pedal was stopped at a position for more than a threshold amount of time or a decrease in brake pedal application distance from a condition when the brake pedal was being applied. For example, if a brake pedal is applied a first distance, stopped, and then applied a second distance and stopped, two braking events have occurred. Further, if the brake pedal is applied and released without stopping, two braking events have occurred (e.g., the application and the release).

In some examples, a braking event is not counted if a braking event prior to a present braking event occurred more than a threshold time ago. For example, if a first braking event occurs at time T0 and a second braking event occurs at time T1, time T1 later than time T0 by greater than the threshold amount of time, only one braking event is counted (e.g., the braking event at time T1). Further, the number of braking events may be reduced by a value of one every threshold number of seconds unless braking events continue to occur within a predetermined time interval (e.g., every 15 seconds). Further still, the number of braking events may be adjusted to a value of zero when the engine is not idling. Thus, braking events may have to occur with a predetermined frequency for the actual number of braking events to continue increasing, and the actual number of braking events may decrease over time if braking events do not occur at a predetermined frequency. Method 300 proceeds to 312 after the number of brake events begin to be counted.

At 310, method 300 determines an amount of stored vacuum. In one example, method 300 determines an amount of vacuum in a vacuum reservoir or a brake booster by measuring pressure in the brake booster or the vacuum reservoir. Method 300 proceeds to 312 after the amount of stored vacuum is determined.

At 312, method 300 adjusts a threshold vacuum level for the vacuum reservoir or the brake booster based on barometric pressure. The threshold vacuum level may be empirically determined and stored to controller memory. For example, if a threshold vacuum is 30 kPa below barometric pressure at sea level, the threshold vacuum may be reduced to 25 kPa at a higher altitude. By adjusting the threshold vacuum level for barometric pressure, the vacuum pump speed may be increased sooner in time in response to decreasing stored vacuum so that additional vacuum may be provided via the vacuum pump sooner. In one example, the threshold vacuum level is decreased in response to a decrease in barometric pressure. The threshold vacuum level is increased in response to an increase in barometric pressure. Method 300 proceeds to 314 after the threshold level of stored vacuum is adjusted for barometric pressure.

At 314, method 300 adjusts first and second groups of engine idle speeds in response to barometric pressure. In one example, a first group of engine idle speeds is provided for an actual number of braking events when a stored amount of vacuum is less than a threshold vacuum. For example, if stored vacuum is less than the threshold vacuum and the number of braking events is two, the desired engine idle speed may be adjusted to 700 RPM. If stored vacuum is less than the threshold vacuum and the number of braking events is four, the desired engine idle speed may be adjusted to 750 RPM. The second group of engine idle speeds is provided for an actual number of braking events when a stored amount of vacuum is greater than the threshold vacuum. For example, if stored vacuum is greater than the threshold vacuum and the number of braking events is two, the desired engine idle speed may be adjusted to 650 RPM. If stored vacuum is great than the threshold vacuum and the number of braking events is four, the desired engine idle speed may be adjusted to 700 RPM. Method 300 proceeds to 316 after the engine idle speeds in the groups are adjusted.

At 316, method 300 judges if the stored vacuum level is less than the threshold vacuum determined and adjusted at 312. In one example, method 300 compares the threshold vacuum determined at 312 to a pressure in a vacuum reservoir or the brake booster. If the stored vacuum level is less than the threshold vacuum, the answer is yes and method 300 proceeds to 330. Otherwise, the answer is no and method 300 proceeds to 318.

At 318, method 300 judges if an actual total number of braking events is greater than (G.T.) a threshold number of events. In one example, the number is two so that one brake application and release may be tolerated without increasing engine speed to generate additional vacuum production (e.g., a higher flow rate of air out of the vacuum reservoir). However, any integer number may be the threshold actual number of braking events. If the actual total number of braking events has been exceeded, the answer is yes and method 300 proceeds to 320. Otherwise, the answer is no and method 300 proceeds to exit.

At 330, method 300 increases engine speed based on the first group of desired engine idle speed values in response to the number of braking events. For example, if the first group of desired engine idle speeds includes values of 700 RPM for two braking events, 750 RPM for four braking events, and 800 RPM for six braking events, the desired engine speed is adjusted to 750 RPM if the actual number of braking events is four. The engine idle speed is increased to 750 RPM via increasing fuel supplied to the engine cylinders and/or advancing fuel injection timing. Conversely, the desired engine idle speed may be decreased via reducing an amount of fuel injected and retarding fuel injection start of injection timing. Method 300 proceeds to 332 after the engine idle speed is adjusted.

At 332, method 300 limits engine idle speed to a speed less than a speed where greater than (G.T.) a threshold amount of engine torque is transferred to the torque converter turbine. For example, if it is determined that more than a threshold amount of engine torque is transferred to a torque converter turbine at 850 RPM at 306, engine idle speed is limited to less than 850 RPM. Alternatively, method 300 limits engine idle speed to a speed less than a speed where greater than a threshold percentage of engine torque is transferred to the torque converter turbine. Method 300 exits after engine idle speed is limited.

At 320, method 300 increases engine speed based on the second group of desired engine idle speed values in response to the number of braking events. For example, if the second group of desired engine idle speeds includes values of 650 RPM for two braking events, 700 RPM for four braking events, and 750 RPM for six braking events, the desired engine speed is adjusted to 750 RPM if the actual number of braking events is six. The engine idle speed is increased to 750 RPM via increasing fuel supplied to the engine cylinders and/or advancing fuel injection timing. Method 300 proceeds to 332 after the engine idle speed is adjusted.

Thus, the method of FIG. 3 provides for an engine method, comprising: increasing a speed of a vacuum pump via increasing engine idle speed when an engine is idling in response to a request to increase an amount of stored vacuum. The method includes where the engine idle speed is increased to a speed based on barometric pressure. The method includes where the request to increase the amount of stored vacuum is based on an amount of stored vacuum. The method includes where the request to increase the amount of stored vacuum is based on a number of braking events. The method includes where the number of braking events is based on an actual total number of increases in brake pedal application distance. The method includes where the number of braking events is based on an actual total number of decreases in brake pedal application distance. The method includes where the engine idle speed is increased via advancing fuel injection timing.

The method of FIG. 3 also provides for an engine method, comprising: increasing a speed of a vacuum pump via increasing engine idle speed in response to a request to increase an amount of stored vacuum; and limiting the engine idle speed to a speed where less than a threshold amount of engine torque is transferred through a torque converter. The method includes where the engine idle speed is increased via advancing fuel injection timing. The method includes where the engine idle speed is based on barometric pressure. The method includes where the engine idle speed is based on an actual total number of braking events when the engine is at idle speed. The method further comprises decreasing engine idle speed to a base engine idle speed in response to application of an accelerator pedal. The method further comprises increasing engine idle speed in increments based on an actual total number of braking events.

Referring now to FIG. 4, an example vehicle braking sequence where engine speed is adjusted to increase output of a vacuum pump is shown. The signals and sequences of FIG. 4 may be provided by the system shown in FIGS. 1 and 2 executing the method of FIGS. 3. Vertical markers T0-T6 represent times of interest in the sequence. In this example, vacuum is provided via an engine rotating a mechanical vacuum pump coupled to the engine as shown in FIG. 1.

The first plot from the top of FIG. 4 represents engine speed versus time. The X represents time and time increases from the left side of the plot to the right side of the plot. The Y axis represents engine speed and engine speed increases in the direction of the Y axis arrow. Horizontal line 402 represents a base engine idle speed. Horizontal line 404 represents a first engine idle speed adjusted for three vehicle braking events. Horizontal line 406 represents a second engine idle speed adjusted for five vehicle braking events.

The second plot from the top of FIG. 4 represents vehicle brake pedal position versus time. The brake pedal application distance increases in the direction of the Y axis arrow. The X represents time and time increases from the left side of the plot to the right side of the plot.

The third plot from the top of FIG. 4 represents an amount of stored vacuum versus time. The Y axis represents an amount of stored vacuum and the amount of stored vacuum increases in the direction of the Y axis arrow. The X axis represents time and time increases from the left to the right side of the figure.

The fourth plot from the top of FIG. 4 represents accelerator pedal position versus time. The Y axis represents accelerator pedal position and accelerator pedal position increases in the direction of the Y axis arrow. The X axis represents time and time increases from the left to the right side of the figure.

The fifth plot from the top of FIG. 4 represents an actual total number of vehicle braking events versus time. The Y axis represents actual total number of vehicle braking events and the actual total number of vehicle braking events increases in the direction of the Y axis arrow. The X axis represents time and time increases from the left to the right side of the figure.

At time T0, the engine speed is decreasing and the brake pedal is applied. The amount of stored vacuum is increasing since the brake pedal position is constant. The accelerator is not applied and the actual number of braking events is zero since the engine is not at idle. These conditions may be indicative of decelerating a vehicle.

At time T1, the brake pedal is released and the engine speed continues to decline to the base idle speed. The amount of stored vacuum decreases as the master cylinder consumes vacuum in response to releasing the brake pedal. The accelerator pedal is not applied and the number of braking events is zero since the engine is not at idle speed.

Between time T1 and time T2, the engine speed reaches the base idle speed and the vehicle brakes are not applied. The vehicle may move at a creep speed based on the amount of engine torque produced at idle.

At time T2, the driver applies the brake pedal and increases the brake pedal position while the engine is idling. The amount of stored vacuum is decreased in response to the driver applying the brake pedal and the actual number of braking events increases to a value of one. The accelerator pedal is not applied.

Between time T2 and time T3, the driver partially releases the brake pedal and the amount of stored vacuum decreases. The amount of stored vacuum increases between brake release and apply events as the vacuum pump rotates and increases vacuum (not shown).

At time T3, the driver applies the brake pedal increasing the brake pedal position a second time while the engine is at idle speed. The amount of stored vacuum is decreased in response to the brake application and the number of braking events increases to a value of three. The engine idle speed is increase to the engine speed level 404 in response to the number of braking events reaching three. Thus, the engine idle speed was not increased for the first two braking events, but the idle speed was increased for the third braking event. The accelerator pedal is not applied.

Between time T3 and time T4, the driver releases the brake pedal and the amount of stored vacuum decreases. The number of braking events also increases by one to a value of four.

At time T4, the brake pedal is applied a third time while the engine is at idle speed. The amount of stored vacuum continues to decrease in response to the brake application and the number of braking events is increased to five. The engine idle speed is increased a second time to the level of 406 in response to the number of braking events reaching a value of five. The accelerator pedal is not applied.

Between time T4 and time T5, the driver releases the brake pedal and the brake pedal position transitions to zero (e.g., not applied). The amount of stored vacuum increases since vacuum is not being consumed. The actual number of braking events reaches a value of five and then increments downward in response to the brake pedal not being applied. The actual number of braking events is adjusted to zero in response to the stored amount of vacuum reaching a threshold level. In alternative examples, the number of actual braking events may countdown to zero before a threshold vacuum level is reached. The engine idle speed is reduced to the base idle speed in response to the actual number of braking events being reduced. In other examples, the engine idle speed may be reduced in response to an amount of time since a last braking event is greater than a threshold amount of time.

At time T5, the driver applies the brakes again increasing the brake pedal position. The amount of stored vacuum is decreased in response to applying the vehicle brakes. The accelerator pedal is not applied and the actual number of braking events begins to increase.

Between time T5 and time T6, the driver release and applies the brake pedal. The engine speed is increased in response to the actual number of braking events reaching a value of three.

At time T6, the driver applies the accelerator pedal briefly and the engine accelerates. The actual number of braking events is reduced to a value of zero in response to the driver applying the accelerator pedal. The engine speed increases and then decays to the base idle speed in response to the desired engine idle speed being adjusted to the base idle speed in response to the driver applying the accelerator pedal. The amount of stored vacuum increases and the brake pedal is not applied.

In this way, engine idle speed may be increased or decreased in response to a number of braking events. Additionally, the engine idle speed may be increased or decreased in response to an amount of stored vacuum.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. An engine method, comprising:
    increasing a speed of a vacuum pump via increasing engine idle speed when an engine is idling in response to a request to increase an amount of stored vacuum.

2. The method of claim 1, where the engine idle speed is increased to a speed based on barometric pressure.

3. The method of claim 1, where the request to increase the amount of stored vacuum is based on an amount of stored vacuum.

4. The method of claim 1, where the request to increase the amount of stored vacuum is based on a number of braking events.

5. The method of claim 4, where the number of braking events is based on an actual total number of increases in brake pedal application distance.

6. The method of claim 5, where the number of braking events is based on an actual total number of decreases in brake pedal application distance.

7. The method of claim 1, where the engine idle speed is increased via advancing fuel injection timing.

8. An engine method, comprising:
    increasing a speed of a vacuum pump via increasing engine idle speed in response to a request to increase an amount of stored vacuum; and
    limiting the engine idle speed to a speed where less than a threshold amount of engine torque is transferred through a torque converter.

9. The method of claim 8, where the engine idle speed is increased via advancing fuel injection timing.

10. The method of claim 8, where the engine idle speed is based on barometric pressure.

11. The method of claim 8, where the engine idle speed is based on an actual total number of braking events when the engine is at idle speed.

12. The method of claim 8, further comprising decreasing engine idle speed to a base engine idle speed in response to application of an accelerator pedal.

13. The method of claim 8, further comprising increasing engine idle speed in increments based on an actual total number of braking events.

14. An engine system, comprising:
    a compression ignition engine including a combustion chamber;
    a vacuum pump mechanically coupled to the compression ignition engine; and
    a controller including instructions stored in a non-transitory memory for increasing output of the vacuum pump via increasing engine idle speed, the engine idle speed increased based on barometric pressure and an actual total number of braking events.

15. The engine system of claim 14, where the number of braking events is based on an actual total number of times a brake pedal is applied and released.

16. The engine system of claim 14, further comprising additional instructions to increase the engine idle speed in response to an amount of stored vacuum.

17. The engine system of claim 14, where the engine idle speed is increased in increments based on the actual total number of braking events.

18. The engine system of claim 14, where engine idle speed is limited to less than a threshold speed where greater than a threshold percent of engine torque is transferred to a torque converter turbine.

19. The engine system of claim 14, where the engine idle speed is increased every other change in brake pedal direction.

20. The engine system of claim 14, where the engine idle speed is increased for every change in brake pedal direction.

* * * * *